United States Patent
Jung

(10) Patent No.: US 9,322,316 B2
(45) Date of Patent: Apr. 26, 2016

(54) METHOD AND SYSTEM OF DETERMINING FAILURE OF UREA LEVEL SENSOR

(71) Applicants: Hyundai Motor Company, Seoul (KR); Kia Motors Corporation, Seoul (KR)

(72) Inventor: Jae-Yoon Jung, Yongin (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 215 days.

(21) Appl. No.: 13/862,915

(22) Filed: Apr. 15, 2013

(65) Prior Publication Data

US 2014/0188326 A1   Jul. 3, 2014

(30) Foreign Application Priority Data

Dec. 28, 2012   (KR) .................. 10-2012-0157505

(51) Int. Cl.
*F01N 11/00* (2006.01)
*F01N 3/20* (2006.01)

(52) U.S. Cl.
CPC .............. *F01N 11/00* (2013.01); *F01N 3/2066* (2013.01); *B60W 2520/105* (2013.01); *F01N 2610/02* (2013.01); *F01N 2610/14* (2013.01); *F01N 2610/148* (2013.01); *F01N 2900/1812* (2013.01); *F01N 2900/1814* (2013.01); *Y02T 10/24* (2013.01); *Y02T 10/47* (2013.01)

(58) Field of Classification Search
CPC ............ G01F 25/0061; G01F 25/0069; G01F 25/0076
See application file for complete search history.

(56) References Cited

U.S. PATENT DOCUMENTS

| | | | |
|---|---|---|---|
| 5,485,740 A * | 1/1996 | Lippmann et al. | 73/1.73 |
| 6,397,668 B1 * | 6/2002 | Davison et al. | 73/114.52 |
| 2003/0136173 A1 * | 7/2003 | Elenich et al. | 73/1.73 |
| 2003/0221479 A1 * | 12/2003 | Kim et al. | 73/118.1 |
| 2004/0073386 A1 * | 4/2004 | Benedetti | 702/55 |
| 2004/0225463 A1 * | 11/2004 | Klinger et al. | 702/100 |
| 2005/0072206 A1 * | 4/2005 | Cho | 73/1.73 |
| 2007/0079601 A1 * | 4/2007 | Hirata et al. | 60/286 |
| 2007/0079804 A1 * | 4/2007 | Nakayama | 123/339.15 |
| 2007/0108985 A1 * | 5/2007 | Koo et al. | 324/522 |

(Continued)

FOREIGN PATENT DOCUMENTS

| | | |
|---|---|---|
| JP | 4440132 B2 | 3/2010 |
| KR | 1993-0019905 A | 10/1993 |
| KR | 10-1136767 B1 | 4/2012 |

*Primary Examiner* — Thomas G Black
*Assistant Examiner* — Peter D Nolan
(74) *Attorney, Agent, or Firm* — Morgan, Lewis & Bockius LLP

(57) ABSTRACT

A method and a system of determining failure of a urea level sensor may include: determining whether a difference between current and previous urea levels is smaller than or equal to a first predetermined level; determining, if the difference between the current and previous urea levels is smaller than or equal to the first predetermined level, whether a vehicle speed is faster than a predetermined vehicle speed; determining, if vehicle speed is faster than the predetermined vehicle speed, whether a vehicle acceleration is higher than a predetermined acceleration; determining, if vehicle acceleration is higher than the predetermined acceleration, whether a difference between current and previous raw urea levels is smaller than a predetermined raw urea level; and storing stuck failure code and restricting an output or the vehicle speed if the difference between the current and previous raw urea levels is smaller than the predetermined raw urea level.

11 Claims, 3 Drawing Sheets

(56) References Cited

U.S. PATENT DOCUMENTS

| | | | |
|---|---|---|---|
| 2007/0266697 A1* | 11/2007 | Nishina et al. | 60/277 |
| 2007/0266703 A1* | 11/2007 | Hirata et al. | 60/299 |
| 2008/0245129 A1* | 10/2008 | Wang et al. | 73/1.73 |
| 2008/0245130 A1* | 10/2008 | Wang et al. | 73/1.73 |
| 2009/0199616 A1* | 8/2009 | Stark et al. | 73/1.73 |
| 2009/0205418 A1* | 8/2009 | Barcin et al. | 73/290 R |
| 2009/0211349 A1* | 8/2009 | Kawakita et al. | 73/114.54 |
| 2010/0185360 A1* | 7/2010 | Windbergs et al. | 701/34 |
| 2010/0199753 A1* | 8/2010 | Renner et al. | 73/114.52 |
| 2011/0011178 A1* | 1/2011 | Ulrich et al. | 73/292 |
| 2011/0107812 A1* | 5/2011 | Kasahara | 73/1.02 |
| 2011/0239632 A1* | 10/2011 | Yano et al. | 60/295 |

* cited by examiner

METHOD AND SYSTEM OF DETERMINING FAILURE OF UREA LEVEL SENSOR

CROSS-REFERENCE TO RELATED APPLICATION

The present application claims priority of Korean Patent Application Number 10-2012-0157505 filed Dec. 28, 2012, the entire contents of which application is incorporated herein for all purposes by this reference.

BACKGROUND OF INVENTION

1. Field of Invention

The present invention relates to a method and a system of determining failure of a urea level sensor. More particularly, the present invention relates to a method and a system of determining failure of a urea level sensor which can determine failure of the urea level sensor indicating lack of urea in a urea tank to a driver.

2. Description of Related Art

Generally, urea level sensors are divided into continuous type urea level sensors and non-continuous type urea level sensors. The continuous type urea level sensor is a sensor which continuously detects a urea level using ultrasonic wave, and the non-continuous type urea level sensor is a sensor at which electric contacts of a switch are contacted with each other if the urea level reaches a predetermined level, and thereby indicating a current urea level is the predetermined level.

Each of the continuous type urea level sensor and the non-continuous type urea level sensor has merits and drawbacks. Particularly, the continuous type urea level sensor, compared with the non-continuous type urea level sensor, has merits of assisting a modeling of a urea consumption during a vehicle travels, facilitating release of a compulsory inducement state for a driver (i.e., a state where the driver is forcibly induced to put in the urea because of lack of the urea) when the urea is replenished during the compulsory inducement state for the driver, and allowing the driver to predict replenish timing of the urea since the urea level is shown on a cluster.

In a case of using the continuous type urea level sensor, however, stuck or drift of the urea level sensor can be diagnosed. Recently, regulations demand that the driver is warned and is forcibly induced to replenish the urea if there is lack of the urea in a urea tank. A method of determining failure of the urea level sensor is essentially applied so as to meet the regulations.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a method and a system of determining failure of a urea level sensor having advantages of giving warning to a driver or performing compulsory inducement for the driver efficiently.

A method of determining failure of a urea level sensor according to various aspects of the present invention may include: determining whether a difference between a current urea level and a previous urea level is smaller than or equal to a first predetermined level; determining, if the difference between the current urea level and the previous urea level is smaller than or equal to the first predetermined level, whether a vehicle speed is faster than a predetermined vehicle speed; determining, if the vehicle speed is faster than the predetermined vehicle speed, whether a vehicle acceleration is higher than a predetermined acceleration; determining, if the vehicle acceleration is higher than the predetermined acceleration, whether a difference between a current raw urea level and a previous raw urea level is smaller than a predetermined raw urea level; and storing stuck failure code and restricting an output or the vehicle speed if the difference between the current raw urea level and the previous raw urea level is smaller than the predetermined raw urea level.

The method may further include: storing the current urea level as a reference urea level if the difference between the current urea level and the previous urea level is larger than the first predetermined level.

The method may further include: determining whether an accumulated urea consumption is larger than a predetermined consumption if the difference between the current raw urea level and the previous raw urea level is larger than or equal to the predetermined raw urea level; determining whether a difference between the reference urea level and the current urea level is smaller than a second predetermined level if the accumulated urea consumption is larger than the predetermined consumption; and storing drift failure code and restricting the output or the vehicle speed if the difference between the reference urea level and the current urea level is smaller than the second predetermined level.

In a method of determining failure of a urea level sensor according to various embodiments of the present invention, stuck failure code may be stored if a difference between a current raw urea level and a previous raw urea level is smaller than a predetermined raw urea level in a state where a vehicle speed is faster than a predetermined vehicle speed and a vehicle acceleration is higher than a predetermined acceleration.

An output or the vehicle speed may be restricted if the stuck failure code is stored.

In the method, drift failure code may be stored if a difference between a reference urea level and the current urea level is smaller than a predetermined level in a state where the difference between the current raw urea level and the previous raw urea level is larger than or equal to the predetermined raw urea level and an accumulated urea consumption is larger than a predetermined consumption.

An output or the vehicle speed may be restricted if the drift failure code is stored.

A system for determining failure of a urea level sensor for detecting a raw urea level according to various embodiments of the present invention may include: a vehicle speed sensor detecting a vehicle speed; an acceleration sensor detecting a vehicle acceleration or calculating the vehicle acceleration from the detected vehicle speed; a urea pressure sensor detecting a urea pressure of a dosing module; and a control unit electrically connected to the urea level sensor, the vehicle speed sensor, the acceleration sensor and the urea pressure sensor, calculating a urea level from the raw urea level, determining the failure of the urea level sensor, and performing control according to the failure determination, wherein the control unit stores stuck failure code if a difference between a current raw urea level and a previous raw urea level is smaller than a predetermined raw urea level in a state where the vehicle speed is faster than a predetermined vehicle speed and the vehicle acceleration is higher than a predetermined acceleration.

The control unit may restrict an output or the vehicle speed if the stuck failure code is stored.

The control unit may store drift failure code if a difference between a reference urea level and the current urea level is smaller than a predetermined level in a state where the difference between the current raw urea level and the previous raw urea level is larger than or equal to the predetermined raw urea level and an accumulated urea consumption is larger than a predetermined consumption.

The control unit may restrict an output or the vehicle speed if the drift failure code is stored.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
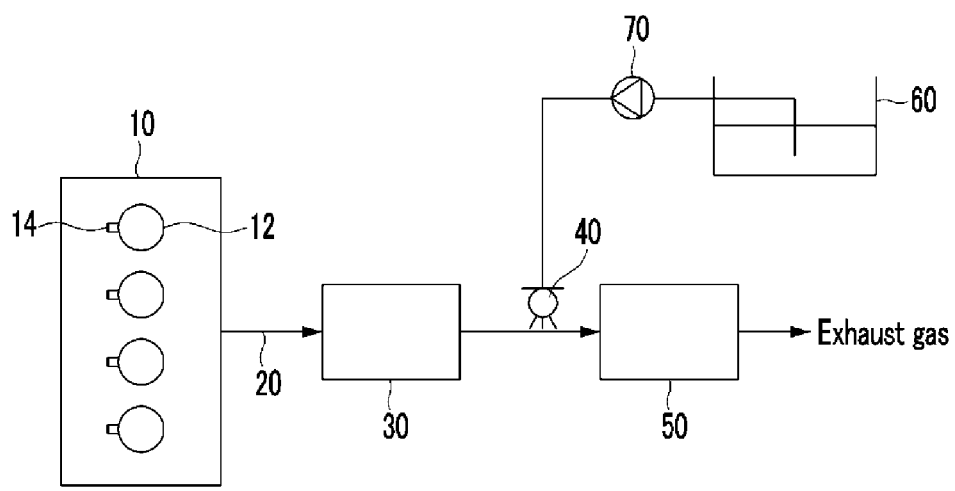
FIG. 1 is a schematic diagram of an exemplary exhaust system to which a method and a system of determining failure of a urea level sensor according to the present invention can be applied.

FIG. 1 is a schematic diagram of an exemplary exhaust system to which a method and a system of determining failure of a urea level sensor according to various embodiments of the present invention can be applied.

As shown in FIG. 1, an exhaust gas generated at an engine 10 having a combustion chamber 12 and an injector 14 passes sequentially through a particulate filter 30 and a selective catalytic reduction (SCR) converter 50. In this process, noxious materials contained in the exhaust gas can be removed. As circumstances demand, an oxidation catalyst instead of the particulate filter 30 may be used or the oxidation catalyst as well as the particulate filter 30 may be used. The particulate filter 30 and the SCR converter 50 are mounted on an exhaust pipe 20.

The engine 10 burns air-fuel mixture in which fuel and air are mixed so as to convert chemical energy into mechanical energy. The engine 10 is connected to an intake manifold so as to receive the air into a combustion chamber, and is connected to an exhaust manifold so as to discharge the exhaust gas generated at combustion process and gathered in the exhaust manifold to the exterior of a vehicle. An injector is mounted in the combustion chamber so as to inject the fuel into the combustion chamber.

The exhaust pipe 20 is connected to the exhaust manifold and the exhaust gas is exhausted to the exterior of the vehicle through the exhaust pipe 20.

The particulate filter 30 is mounted on the exhaust pipe 20 downstream of the engine 10 and traps soot contained in the exhaust gas.

The SCR converter 50 is mounted on the exhaust pipe 20 downstream of the particulate filter 30 and reduces nitrogen oxide contained in the exhaust gas into nitrogen gas using reducing agent.

For these purposes, the exhaust system further includes a urea tank 60, a urea pump 70 and a dosing module 40.

The urea tank 60 stores urea therein.

The urea pump 70 pumps the urea in the urea tank 60.

The dosing module 40 injects the urea pumped by the urea pump 70 into the exhaust pipe 20. The dosing module 40 is mounted on the exhaust pipe 20 between the particulate filter 30 and the SCR converter 50 and injects the urea to the exhaust gas that will flow into the SCR converter 50. The urea injected to the exhaust gas is decomposed into ammonia and the decomposed ammonia is used as the reducing agent for the nitrogen oxide.

Figure 2:
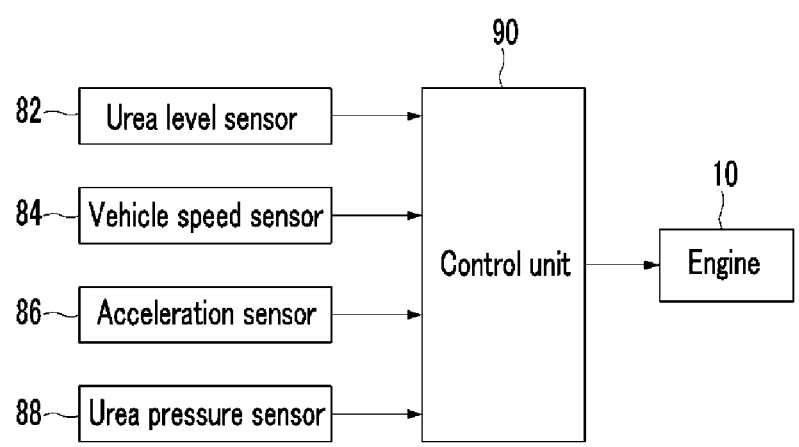
FIG. 2 is a block diagram of an exemplary system for determining failure of a urea level sensor according to the present invention.

FIG. 2 is a block diagram of a system for determining failure of a urea level sensor according to various embodiments of the present invention.

As shown in FIG. 2, a system for determining failure of a urea level sensor according to various embodiments of the present invention includes a urea level sensor 82, a vehicle speed sensor 84, an acceleration sensor 86, a urea pressure sensor 88, a control unit 90 and the engine 10.

The urea level sensor 82 is mounted at the urea tank 60 and detects a urea level in the urea tank 60 using ultrasonic wave. Generally, a level surface of the urea in the urea tank 60 changes continuously during the vehicle runs. In this specification, a raw urea level means the urea level detected at any moment and the urea level means an average of the raw urea level for any period. That is, the raw urea level is a value which changes continuously even though the urea is not supplied nor consumed, and the urea level is a value which does not change if the urea is not supplied nor consumed. In addition, the urea level sensor 82 is a continuous type urea level sensor and detects the raw urea level continuously. The urea level sensor 82 may calculate the urea level by calculating the average of the raw urea level for a predetermined period. Signals corresponding to the detected raw urea level and the urea level are transmitted to the control unit 90.

The vehicle speed sensor 84 detects a vehicle speed and transmits a signal corresponding thereto to the control unit 90.

The acceleration sensor 86 detects a vehicle acceleration and transmits a signal corresponding thereto to the control unit 90. The acceleration sensor 86 may detect the vehicle acceleration directly or may calculate the vehicle acceleration by using the vehicle speed detected by the vehicle speed sensor 84.

The urea pressure sensor 88 mounted on a line between the urea pump 70 and the dosing module 40, detects a urea pressure, and transmits a signal corresponding thereto to the control unit 90.

The control unit 90 is electrically connected to the urea level sensor 82, the vehicle speed sensor 84, the acceleration sensor 86 and the urea pressure sensor 88, and receives the signals corresponding to the raw urea level, the urea level, the vehicle speed, the vehicle acceleration and the urea pressure from the urea level sensor 82, the vehicle speed sensor 84, the acceleration sensor 86 and the urea pressure sensor 88.

The control unit 90 is configured to determine failure of the urea level sensor 82 based on the signals. If the failure of the urea level sensor 82 is determined, the control unit 90 controls the engine 10 to restrict the vehicle speed or an output.

The control unit 90 can be realized by one or more processors activated by predetermined program, and the predetermined program can be programmed to perform each step of a method of determining failure of a urea level sensor according to various embodiments of the present invention.

Hereinafter, a method of determining failure of a urea level sensor according to various embodiments of the present invention will be described in detail with reference to FIG. 3.

Figure 3:
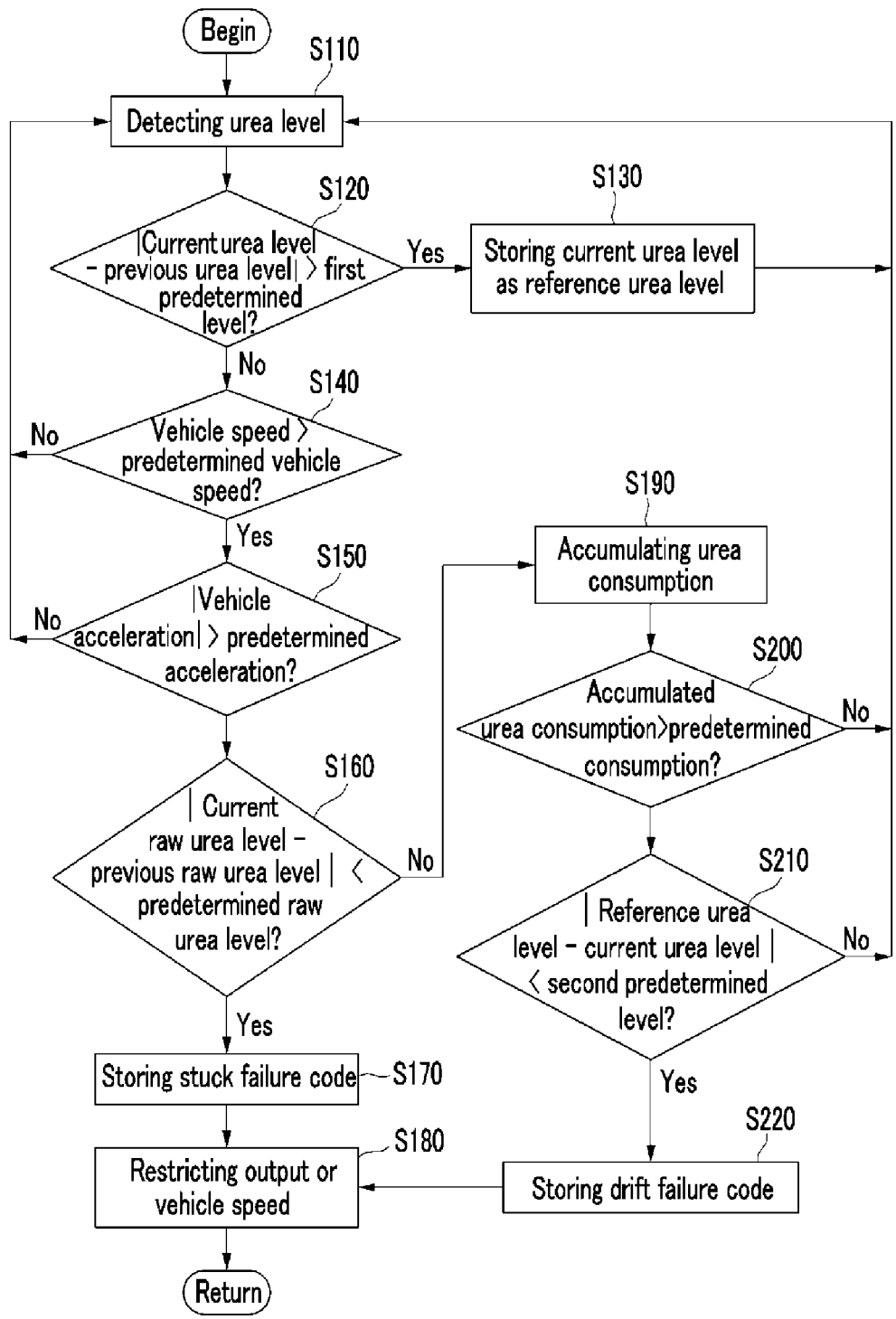
FIG. 3 is a flowchart of an exemplary method of determining failure of a urea level sensor according to the present invention.

FIG. 3 is a flowchart of a method of determining failure of a urea level sensor according to various embodiments of the present invention.

As shown in FIG. 3, the method of determining failure of the urea level sensor according to various embodiments of the present invention begins by detecting the urea level at step S110. As described above, the urea level means the average of the raw urea level for the predetermined period.

The control unit 90 determines whether a difference between a current urea level and a previous urea level is larger than a first predetermined level at step S120. Herein, the current urea level means the urea level that is detected at present and the previous urea level means the urea level that is detected before a predetermined time and stored at the control unit 90. In addition, a suitable value may be set as the first predetermined level by a person of an ordinary skill in the art, and may be, for example, a value between 0.31-21.

If the difference between the current urea level and the previous urea level is larger than the first predetermined level at step S120, the control unit 90 determines that the urea is replenished and stores the current urea level as a reference urea level at step S130. After that, the control unit 90 proceeds to the step S110.

If the difference between the current urea level and the previous urea level is smaller than or equal to the first predetermined level at the step S120, the control unit 90 determines whether the vehicle speed is faster than a predetermined vehicle speed at step S140. A suitable value may be set as the predetermined vehicle speed by a person of an ordinary skill in the art, and may be, for example, 2 km/h.

If the vehicle speed is slower than or equal to the predetermined vehicle speed at the step S130, the control unit 90 proceeds to the step S110.

If the vehicle speed is faster than the predetermined vehicle speed, it is determined whether an absolute value of the vehicle acceleration is higher than a predetermined acceleration at step S150. A suitable value may be set as the predetermined acceleration by a person of an ordinary skill in the art, and may be, for example, a value between 0.1 $m/s^2$-5 $m/s^2$.

If the vehicle speed is faster than the predetermined speed and the absolute value of the vehicle acceleration is higher than the predetermined acceleration, a level surface of the urea in the urea tank 60 changes continuously. Therefore, if the raw urea level detected by the urea level sensor 82 is hardly changed, it can be determined that stuck failure occurs at the urea level sensor 82.

For this purpose, the control unit 90 determines whether a difference between the current raw urea level and the previous raw urea level is smaller than a predetermined raw urea level at step S160. That is, the control unit 90 determines whether the raw urea level changes by more than the predetermined raw urea level. Herein, the current raw urea level may be a maximum value or a minimum value of the raw urea level detected for a predetermined time, and the previous raw urea level may be a minimum value or a maximum value of the raw urea level for a predetermined time. In addition, suitable value may be set as the predetermined raw urea level by a person of an ordinary skill in the art.

If the difference between the current raw urea level and the previous raw urea level is smaller than the predetermined raw urea level at the step S160, the control unit 90 stores a stuck failure code at step S170 and controls the engine 10 to restrict the output or the vehicle speed at step S180.

If the difference between the current raw urea level and the previous raw urea level is larger than or equal to the predetermined raw urea level at the step S160, the control unit 90 accumulates a urea consumption at step S190. The urea consumption may be calculated based on a urea injection amount or the urea pressure.

After that, the control unit 90 determines whether the accumulated urea consumption is larger than a predetermined consumption at step S200. A suitable value may be set as the predetermined consumption by a person of an ordinary skill in the art, and may be, for example, a value between 0.11-11.

If the accumulated urea consumption is smaller than or equal to the predetermined consumption at the step S200, the control unit 90 returns to the step S110.

If the accumulated urea consumption is larger than the predetermined consumption at the step S200, the control unit 90 determines whether a difference between the reference urea level and the current urea level is smaller than a second predetermined level at step S210. That is, if the urea level does not change even though a substantial amount of the urea is used, it can be determined that drift failure occurs at the urea level sensor 82. Herein, the reference urea level may be the urea level that is detected at first when the method according to various embodiments of the present invention begins or after the urea is replenished. In addition, a suitable value may be set as the second predetermined level by a person of an ordinary skill in the art, and may be, for example, a value between 0.31-0.51.

If the difference between the reference urea level and the current urea level is larger than or equal to the second predetermined level at the step S210, the control unit 90 returns to the step S110.

If the difference between the reference urea level and the current urea level is smaller than the second predetermined level at the step S210, the control unit 90 stores a drift failure code at step S220 and controls the engine 10 to restrict the output or the vehicle speed at the step S180.

Since failure of the urea level sensor can be diagnosed as described above, it may be prepared in advance that the case occurs where regulations can be broken, according to various embodiments of the present invention.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of determining failure of a urea level sensor, comprising:
   determining whether a difference between a current urea level and a previous urea level is smaller than or equal to a first predetermined level;
   determining, when the difference between the current urea level and the previous urea level is smaller than or equal to the first predetermined level, whether a vehicle speed is faster than a predetermined vehicle speed;
   determining, when the vehicle speed is faster than the predetermined vehicle speed, whether a vehicle acceleration is higher than a predetermined acceleration;
   determining, when the vehicle acceleration is higher than the predetermined acceleration, whether a difference between a current raw urea level and a previous raw urea level is smaller than a predetermined raw urea level; and
   storing stuck failure code and restricting an output or the vehicle speed when the difference between the current raw urea level and the previous raw urea level is smaller than the predetermined raw urea level.

2. The method of claim 1, further comprising storing the current urea level as a reference urea level when the difference between the current urea level and the previous urea level is larger than the first predetermined level.

3. The method of claim 2, further comprising:
   determining whether an accumulated urea consumption is larger than a predetermined consumption when the difference between the current raw urea level and the previous raw urea level is larger than or equal to the predetermined raw urea level;
   determining whether a difference between the reference urea level and the current urea level is smaller than a second predetermined level when the accumulated urea consumption is larger than the predetermined consumption; and
   storing drift failure code and restricting the output or the vehicle speed when the difference between the reference urea level and the current urea level is smaller than the second predetermined level.

4. A method of determining failure of a urea level sensor, comprising:
   determining whether a difference between a current urea level and a previous urea level is smaller than or equal to a first predetermined level;
   determining, when the difference between the current urea level and the previous urea level is smaller than or equal to the first predetermined level, whether a vehicle speed is faster than a predetermined vehicle speed;
   determining, when the vehicle speed is faster than the predetermined vehicle speed, whether a vehicle acceleration is higher than a predetermined acceleration; and
   determining, when the vehicle acceleration is higher than the predetermined acceleration, whether a difference between a current raw urea level and a previous raw urea level is smaller than a predetermined raw urea level,
   wherein stuck failure code is stored when the difference between the current raw urea level and the previous raw urea level is smaller than the predetermined raw urea level in a state where the vehicle speed is faster than the predetermined vehicle speed and the vehicle acceleration is higher than the predetermined acceleration.

5. The method of claim 4, wherein an output or the vehicle speed is restricted when the stuck failure code is stored.

6. The method of claim 4, wherein drift failure code is stored when a difference between a reference urea level and the current urea level is smaller than a predetermined level in a state where the difference between the current raw urea level and the previous raw urea level is larger than or equal to the predetermined raw urea level and an accumulated urea consumption is larger than a predetermined consumption.

7. The method of claim 6, wherein an output or the vehicle speed is restricted when the drift failure code is stored.

8. A system for determining failure of a urea level sensor which detects a raw urea level, comprising:
   a vehicle speed sensor detecting a vehicle speed;
   an acceleration sensor detecting a vehicle acceleration or calculating the vehicle acceleration from the detected vehicle speed;
   a urea pressure sensor detecting a urea pressure of a dosing module; and
   a control unit electrically connected to the urea level sensor, the vehicle speed sensor, the acceleration sensor and the urea pressure sensor, calculating a urea level from the raw urea level, determining the failure of the urea level sensor, and performing control according to the failure determination;
   wherein the control unit determines whether a difference between a current urea level and a previous urea level is smaller than or equal to a first predetermined level;
   wherein the control unit determines, when the difference between the current urea level and the previous urea level is smaller than or equal to the first predetermined level, whether the vehicle speed is faster than a predetermined vehicle speed;
   wherein the control unit determines, when the vehicle speed is faster than the predetermined vehicle speed, whether the vehicle acceleration is higher than a predetermined acceleration;
   wherein the control unit determines, when the vehicle acceleration is higher than the predetermined acceleration, whether a difference between a current raw urea level and a previous raw urea level is smaller than a predetermined raw urea level; and
   wherein the control unit stores stuck failure code when the difference between the current raw urea level and the previous raw urea level is smaller than the predetermined raw urea level in a state where the vehicle speed is faster than the predetermined vehicle speed and the vehicle acceleration is higher than the predetermined acceleration.

9. The system of claim 8, wherein the control unit restricts an output or the vehicle speed when the stuck failure code is stored.

10. The system of claim 8, wherein the control unit stores drift failure code when a difference between a reference urea level and the current urea level is smaller than a predetermined level in a state where the difference between the current raw urea level and the previous raw urea level is larger than or equal to the predetermined raw urea level and an accumulated urea consumption is larger than a predetermined consumption.

11. The system of claim 10, wherein the control unit restricts an output or the vehicle speed when the drift failure code is stored.

* * * * *